Patented July 28, 1942

2,291,205

UNITED STATES PATENT OFFICE 2,291,205

PINE OIL COMPOSITION

Joseph N. Borglin, Wilmington, Del., assignor to Hercules Powder Company, Wilmington, Del., a corporation of Delaware No Drawing. Application March 26, 1941, Serial No. 385,311

10 Claims. (Cl. 252—310)

This invention relates to compositions of matter containing pine oil, and more particularly to aqueous pine oil emulsions of the oil-in-water type and compositions adapted to yield such emulsions.

Aqueous pine oil emulsions have been heretofore prepared employing ordinary fatty acid soaps as the emulsifying agent for maintaining the pine oil in the dispersed state. In addition, the use of rosin soaps such as the sodium salt of rosin has been proposed as an emulsifying agent for pine oil. Pine oil emulsions so prepared have been subject to numerous disadvantages such as improper viscosity for many uses, insufficient body and consistency, excessive instability or deterioration by oxidation, discoloration with the passage of time, etc. In addition, with the prior emulsifying agents, it was difficult to prepare a gel containing water in amounts insufficient to yield a separate aqueous phase and insufficient to yield a clear mobile solution.

It is an object of the present invention to prepare a composition of matter capable of yielding an improved pine oil emulsion.

Another object is to provide an improved composition of matter adapted to be shipped and stored with a minimum amount of water and either in the form of or adapted to yield upon dilution with water a pine oil emulsion.

A further object is to provide an improved gel-like composition containing pine oil and a limited amount of water.

Another object is to provide an improved clear solution containing pine oil and water.

A still further object is to provide an improved aqueous emulsion of pine oil in water.

Still further objects will more fully hereinafter appear.

In accordance with the present invention, the foregoing objects are accomplished by employing an alkaline soap of polymerized rosin as the emulsifying agent for the pine oil. The alkali soap of polymerized rosin yields pine oil compositions and emulsions of improved properties. This emulsifying agent yields a more viscous composition, and imparts more body and consistency to the final emulsion or diluted emulsion. The compositions and the final or diluted emulsion possess improved properties particularly with respect to oxidation, deterioration, development of color upon ageing, and stability. The superior retention of light color by compositions and emulsions prepared in accordance with the present invention is due not only to the decreased tendency of polymerized rosin soaps to oxidize because of their reduced unsaturation, but also to the properties of polymerized rosin soap apart from this reduced tendency to oxidize. The compositions made in accordance with the present invention display excellent resistance toward deterioration, and pine oil emulsions in accordance with the present invention show excellent resistance to "breaking" by reason of their good stability.

The compositions prepared in accordance with the present invention, and particularly the ultimate emulsion, are adapted to be used wherever pine oil emulsions have heretofore been employed, as for example in the field of disinfectant, germicidal and fungicidal compositions, cleaning and cleansing compositions, detergents, insecticides, and other horticultural preparations, in the textile field where they are adapted to be used as textile scouring agents, as for example in the scouring of cotton, wool, rayon, silk, etc. They may be used in textile pre-spotting baths, in various polishes, in the kier boiling of cotton, in the dyeing of cotton, wool and silk, in baths for delustering rayon and cellulose acetate. The compositions of the present invention will frequently be used ultimately in the emulsion form as an additive constituent of alkali or soap baths used for scouring and deterging. The compositions are, however, equally adapted to use in the fields of disinfectants, germicides, fungicides, insecticides, etc., and in most cases the conditions of use will be such that the composition will exert a cleansing or deterging action as well as a parasiticidal action.

The emulsifying agent employed in accordance with the present invention may comprise any alkali soap of polymerized rosin. While it will usually be preferred to use the sodium soap by reason of its cheapness, other alkali soaps may be used such as those formed with potassium, lithium, ammonia, or organic alkalies such as for example, triethanolamine, other organic substituted amines or ammonias, such as the quaternary ammonium hydroxides, etc. The soaps may be either pre-formed or may be formed in situ during the preparation of the composition or the emulsion, for example, by commingling the pine oil with polymerized rosin and then admixing the mixture with a free alkali which may be either anhydrous or in aqueous solution.

In general, compositions prepared in accordance with the present invention will fall into one or four types depending upon the amount of water present in the composition. These types will be described in the order of increasing water content. The first type is the anhydrous composition consisting of pine oil and the soap of polymerized rosin. For example, pine oil may be commingled with anhydrous polymerized rosin soap and the resulting mixture or suspension shipped in this form to the consumer who may emulsify it in any suitable manner as by admixture with water or other aqueous medium.

A second type of composition comprises pine oil and polymerized rosin soap in the desired proportions and in addition, a small amount of water which is sufficient to yield a gel but which is insufficient to cause the formation of a clear, mobile solution. Because of its homogeneous nature, this gel is adapted to be shipped as such and because of its low content of water, shipping and storage costs are extremely low. The gel may be converted to an emulsion by admixture with water or other aqueous medium.

A third form of composition is a clear solution of pine oil, polymerized rosin soap, and water in amount greater than that required to cause the formation of the gel-like material just referred to, but insufficient to cause the formation of a separate aqueous phase as would be the case in an emulsion. This clear solution which may be termed "soluble pine oil" may be readily converted to the emulsion form by the addition of water thereto.

A fourth type of composition is the ultimate emulsion of pine oil in water, the emulsifying agent being polymerized rosin soap. Ordinarily, if the emulsion is shipped or stored, it will contain as little water as possible. This form of the composition comprises the emulsion either in such concentrated form or diluted up to the point where breaking occurs, which ordinarily will be at around 1% of pine oil. However, the point at which breaking occurs will depend to some extent upon the precise nature of the pine oil and of the polymerized rosin soap and the presence or absence of other constituents such as other emulsifying agents, dissolved constituents of the water where undistilled water is used, etc., and upon the proportions of polymerized rosin soap relative to pine oil.

Because of the large number of variables it is impossible to state precisely the amounts of water which will give rise either to the gel, the clear solution, or the emulsion, although these proportions may readily be determined by experiment, observing the point at which transformation to a succeeding form takes place with the progressive addition of water. If desired, one may start with the anhydrous mixture or substantially anhydrous mixture of pine oil and polymerized rosin soap, progressively adding water thereto and thereby carrying it through the successive stages referred to.

In general, however, compositions containing from about 80% to about 90% of pine oil, and from about 1% to about 10% of the sodium salt of polymerized rosin, for example, and containing from about 1% to about 5% of water, will be in the form of the gel. Upon dilution with water to a concentration of water in excess of about 5%, but not exceeding about 12%, the gel is converted into the form of the clear solution. Upon adding water to this clear solution, an emulsion will be formed.

In general the aqueous compositions of the present invention may comprise from about 1% to about 95% of pine oil, from about 0.1% to about 50% by weight of the alkali soap of polymerized rosin and from about 5% to about 99% of water. The anhydrous composition may consist of from about 50% to about 95% of pine oil and from about 5% to about 50% of the alkali soap of polymerized rosin.

It will be understood, however, that the foregoing typical figures are illustrative only, and that because of the variability of the proportion of the pine oil relative to the water and to the polymerized rosin soap and to the variability of the type of pine oil and polymerized rosin soap employed, these figures are by no means limiting.

The proportions of pine oil and polymerized rosin soap relative to one another may vary within wide limits, provided the polymerized rosin soap is present in amount sufficient to cause emulsification of the pine oil when the composition is diluted sufficiently to pass the clear solution stage and preferably in amount sufficient to enable dilution to as low as about 1% of pine oil. For example, the amount of polymerized rosin soap based on pine oil may vary from about 5% to about 150% based on the weight of pine oil.

If desired, a portion of the pine oil may be replaced with another oil such as mineral oil, kerosene, or other solvent such as ethylene dichloride, trichlorethylene, etc., in amounts ranging up to about 50% by weight based on the weight of pine oil. It is preferred, however, not to use large amount of such other oil, since such proportions tend to overcome the advantages of pine oil by itself. The compositions of the present invention, and particularly soluble pine oil prepared in accordance therewith, may be blended with the soluble mineral cutting oils used for machining operations wherein the pine oil is advantageous because of its marked germicidal and fungicidal effects. In such case the percentage of pine oil in the resulting soluble cutting oil might be as low as 5% or lower by weight based on the total weight of mineral oil and pine oil.

The polymerized rosin used in the following examples was polymerized wood rosin having an acid number of 151 to 155, a melting point of 98–100° C. as determined by the Hercules drop method, and a color of G. However, it will be understood that polymerized rosin of any type may be used in accordance with the present invention. The methods of manufacture of polymerized rosin are well known to the art and need not be referred to in detail here. In general, polymerized rosin is characterized by a melting point increase above ordinary rosin of from about 5° to about 100° C. Polymerized rosin is characterized by physical properties similar to ordinary rosin but with the differences that it has a molecular weight of from about 5% to about 400% greater than ordinary rosin in its pure state, that it has a materially increased melting point as indicated above, that it is substantially free from hardening substances held in combination, that it has an iodine value materially lower than that of ordinary rosin, and that its acid number may vary from about that of the original rosin to about 100. Preferably, the polymerized rosin employed in the present invention has a melting point of at least 95° C., ranging upwardly to about 170° C., the melting point of the pure dimer. The rosin may be polymerized by mineral acids, metal halides, etc., and the polymerized rosin, regardless of the method of polymerization, may be further refined in any desired manner as for example by means of selective solvents such as furfural, etc., selective adsorbents such as fullers' earth, etc.

Below are given a number of specific examples illustrating the principles of the present invention. It will be understood, however, that these examples are not limiting but are merely given to show typical embodiments of the present invention.

In the examples, the pine oil used was the terpene fraction produced by steam distillation or steam-solvent distillation of pine wood, boiling within the range of 205° C. to 220° C., and containing 82% or more of terpene alcohols. Use of this oil is preferred.

*Example 1*

| | Parts by weight |
|---|---|
| Pine oil | 18 |
| Mineral oil | 2 |
| Diglycol stearate | 8 |
| Polymerized rosin | 12 |
| Ammonia (28% aqueous solution) | 8 |
| Water | 200 |

The polymerized rosin was melted and the ammonia cautiously added with stirring. Thereupon, the mineral oil, pine oil, and diglycol stearate were added and stirred in. The water was then slowly added while the whole was vigorously agitated. A stable emulsion resulted. The resulting emulsion contained by weight pine oil 7.2%, mineral oil 0.8%, diglycol stearate 3.2%, ammonium soap of polymerized rosin 5.3%, free $NH_4OH$ 0.4%, and water 82.7%

*Example 2*

| | Per cent by weight |
|---|---|
| Pine oil | 45 |
| Polymerized rosin | 3.5 |
| Triethanolamine | 1.4 |
| Water | 50 |

The polymerized rosin, triethanolamine, and about one-third of the pine oil were added to a mixer and stirred until homogeneous, preferably with gentle heating. Then about half of the water was stirred in and the mixture stirred until uniform. Thereupon, the remainder of the pine oil was gradually added. Thereafter, the remainder of the water was added until emulsification had been effected. The resulting pine oil emulsion was extremely stable in its concentrated form and it could be diluted with water to practically any desired extent. Preferably, dilution of such an emulsion is accomplished by stirring the water into the emulsion. The emulsion could be diluted in this manner to as low as 1% of pine oil by weight.

If desired, the foregoing emulsion may be made still more concentrated, for example by modifying the formula to the following: Pine oil 65%, polymerized rosin 5%, triethanolamine 1.9%, water 28.0%.

This latter formulation may be made by dissolving the triethanolamine in the water and adding gradually with vigorous agitation and preferably at a moderately elevated temperature a solution of the polymerized rosin in the pine oil. The pine oil content of an emulsion so prepared may be reduced by dilution with water to about 10% without the resulting emulsion showing any separation upon standing for 24 hours.

Instead of the foregoing procedures, the triethanolamine soap of the polymerized rosin may be first prepared and stirred into the pine oil to obtain a homogeneous mixture whereupon the water may be added with stirring. Alternatively, preparation may be effected by preparing a concentrated aqueous solution of the soap and then boiling this solution with the pine oil, followed by dilution with water to the desired amount. If desired, a colloid mill may be employed during the preparation of the emulsion in accordance with any of the foregoing methods. Also, the triethanolamine soap of the polymerized rosin may be stirred into the mixture of the pine oil and water to obtain a temporary emulsion which may be passed through the colloid mill to effect a permanent emulsion.

*Example 3*

| | Per cent by weight |
|---|---|
| Pine oil | 57 |
| Polymerized rosin | 25 |
| Potassium hydroxide (anhydrous) | 3.9 |
| Glucose | 1.0 |
| Water | 13.1 |

The potassium hydroxide and water were mixed together and heated to boiling. The polymerized rosin in pulverized form was then slowly added and heating was continued for about 1 hour with occasional stirring. Thereupon, the pine oil was added and heating was continued until a sample withdrawn and poured into water showing no separation of the pine oil. The mixture was then allowed to cool and the glucose dissolved therein. The resulting mixture was an excellent cattle dip in its undiluted form and was a very good disinfectant when diluted with water in a proportion for example of one ounce of the mixture to one gallon of water.

*Example 4*

| | Per cent by weight |
|---|---|
| Pine oil | 60 |
| Sulfonated castor oil (50%) | 30 |
| Polymerized rosin | 7.2 |
| Potassium hydroxide (solid) | 2.8 |

The pine oil and the sulfonated castor oil were admixed together whereupon the polymerized rosin was dissolved therein. The solid potassium hydroxide was then dissolved in the mixture with gentle heating. The resulting mixture was a suspension of the polymerized rosin soap, the sulfonated castor oil and the pine oil, and was adapted to be used as a soluble pine oil disinfectant. Upon admixture with water, it gave a milky emulsion which did not separate out upon standing for long periods of time.

*Example 5*

| | Per cent by weight |
|---|---|
| Pine oil | 90 |
| Polymerized rosin sodium soap | 10 |

The pre-formed polymerized rosin sodium soap in powder form was shaken vigorously with the pine oil. The resulting material was a soluble pine oil composition adapted to be added to detergents, disinfectants, fungicidal, germicidal, or insecticidal compositions prepared with water as a major constituent, or to cutting oil in order to prevent infection when the cutting oil was dissolved in water and used as a cutting lubricant. Upon admixture of the composition with aqueous soap or aqueous alkali detergent compositions, an improved detergent resulted.

*Example 6*

| | Per cent by weight |
|---|---|
| Pine oil | 85 |
| Polymerized rosin potassium soap | 15 |

The pine oil was worked gradually into the polymerized rosin soap in such manner as to avoid lumpiness. The resulting mixture was a suspension of the excess or undissolved polymerized rosin soap in the pine oil. When this mixture was stirred into water, a milky white emulsion results. If desired, for certain uses, up to about 10% by weight of the pine oil may be replaced with kerosene.

*Example 7*

| | Per cent by weight |
|---|---|
| Pine oil | 10.5 |
| Polymerized rosin | 5.2 |
| Oleic acid | 5.2 |
| Sodium hydroxide | 1.2 |
| Sodium carbonate (decahydrate) | 77.4 |
| Water | 0.5 |

The oleic acid and the polymerized rosin were mixed together and heated to about 80° C. whereupon a solution of the sodium hydroxide in the water was added slowly with agitation. Thereupon, the pine oil was stirred in slowly, and finally the crystalline sodium carbonate decahydrate was introduced into the mixture to yield a powdered product which was an excellent detergent and which could be used either as such or dissolved in a suitable amount of water. The resulting mixture contained 5.83% sodium salt of polymerized rosin (55.5% on the weight of pine oil), and a small amount of free sodium hydroxide.

*Example 8*

| | Percent by weight |
|---|---|
| Pine oil | 13.3 |
| Polymerized rosin | 6.1 |
| Oleic acid | 6.1 |
| Sodium hydroxide | 1.6 |
| Trisodium phosphate | 2.7 |
| Water | 70.2 |

The oleic and the polymerized rosin were melted together at about 80° C. A 15% solution of the sodium hydroxide in a portion of the water was prepared. A portion of this solution was added to the mixture and stirred in slowly whereupon the balance of the water together with the trisodium phosphate was added with vigorous agitation. After the temperature had dropped to about 60° C. the balance of the sodium hydroxide solution was added and vigorous agitation was continued until complete saponification had taken place whereupon the pine oil was added by stirring vigorously for an extended period of time. The resulting liquid soap was an excellent scrubbing soap and could be used either as such or considerably diluted with water. The product contained about 7% of polymerized rosin sodium soap (52.7% based on the weight of pine oil), and a small amount of free alkali.

*Example 9*

| | Percent by weight |
|---|---|
| Pine oil | 37.5 |
| Sodium soap of polymerized rosin | 12.5 |
| Water | 50.0 |

The pine oil and the soap were commingled at a moderately elevated temperature whereupon the water was added with vigorous agitation to give the desired emulsion. An abrasive was admixed with the resulting emulsion in any desired proportion so as to give a polish which was particularly adapted for use in polishing metals. Suitable abrasives are precipitated chalk, pumice, or the like. The abrasive may be used in amounts up to about 50% by weight based on the weight of the emulsion depending upon the consistency of the polish desired.

*Example 10*

| | Percent by weight |
|---|---|
| Pine oil | 4 |
| Coconut oil | 10 |
| Polymerized rosin | 5 |
| Potassium hydroxide (anhydrous) | 3.5 |
| Water | 77.5 |

The potassium hydroxide was dissolved in sufficient of the water to give a 20% solution. The coconut oil and polymerized rosin were admixed and heated with half of the aqueous 20% solution of the potassium hydroxide at a temperature of 80–85° C. for ½ hour. The balance of the water was then added to the mixture followed by the remaining half of the 20% potassium hydroxide solution. The mixture was kept at a temperature of 80–85° C. for about 4 hours with agitation, and was then cooled and filtered whereupon the pine oil was stirred in slowly. The resulting composition was suitable as a liquid hand soap and could be diluted as desired with water. The concentrated soap contained 5.8% by weight of the potassium salt of polymerized rosin, and a small amount of free potassium hydroxide.

*Example 11*

| | Parts by weight |
|---|---|
| Pine oil | 70 |
| Polymerized rosin | 12 |
| 25% Sodium hydroxide solution | 5.3 |

The polymerized rosin and the pine oil were mixed in the cold and then neutralized gradually with the solution of caustic soda. The resulting mixture was a liquid of the type known as a soluble pine oil. The mixture contained 13.3 parts by weight of the sodium salt of polymerized rosin and was substantially neutral.

When reference is made herein to water, distilled water is ordinarily preferred although certain types of softened water, natural water, well water, rain water or the like are suitable for use in place of distilled water. The water used should not contain excessive amounts of salts, metallic contamination, or other water soluble or chemically active compounds.

From the foregoing, it will be seen that compositions of matter containing pine oil and prepared in accordance with the principles of the present invention present numerous advantages over pine oil emulsions and similar compositions heretofore available. The enhanced body and consistency imparted by the use of polymerized rosin soap as the emulsifying agent are definitely advantageous, particularly where it is desired to reduce the solids content of the composition or of the pine oil emulsion. The greater stability and greater resistance to deterioration and discoloration are also advantageous. Numerous other advantages of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. A composition of matter comprising pine oil and an alkali soap of polymerized rosin.

2. A composition of matter comprising pine oil, an alkali soap of polymerized rosin, and water.

3. A pine oil emulsion comprising pine oil dispersed throughout an aqueous phase, and an emulsifying agent comprising an alkali soap of polymerized rosin.

4. A composition of matter consisting essentially of an oily medium which is preponderantly pine oil, and an emulsifying agent which comprises preponderantly an alkali soap of polymerized rosin.

5. A composition of matter consisting essentially of an oily medium which is preponderantly pine oil, an emulsifying agent which is preponderantly an alkali soap of polymerized rosin, and water in amount sufficient to cause the formation of a clear mobile homogeneous mixture but insufficient to cause the formation of a separate aqueous phase.

6. A composition of matter comprising an oil-in-water type emulsion wherein the dispersed phase comprises chiefly pine oil, the aqueous phase contains free alkali, and there is present an emulsifying agent comprising an alkali soap of polymerized rosin.

7. A composition of matter comprising from about 1% to about 95% by weight of pine oil, from about 0.1% to about 50% by weight of an alkali soap of polymerized rosin, and from about 5% to about 99% by weight of water.

8. A composition of matter in the form of a gel consisting essentially of an oily medium comprising predominantly pine oil, an emulsifying agent comprising predominantly an alkali soap of polymerized rosin, and water in amount sufficient to yield a gel but insufficient to yield a separate aqueous phase and insufficient to yield a clear solution.

9. A composition of matter comprising a continuous water phase containing an alkali soap of fatty acid and an alkali soap of polymerized rosin, and a dispersed phase containing pine oil.

10. A substantially anhydrous composition of matter consisting of an oily medium comprising preponderantly pine oil and a material adapted to emulsify said oily medium in water, said material comprising preponderantly an alkali soap of polymerized rosin.

JOSEPH N. BORGLIN.